US011428472B2

(12) United States Patent
Teng

(10) Patent No.: US 11,428,472 B2
(45) Date of Patent: Aug. 30, 2022

(54) NETWORKED MONITORING SYSTEM FOR COMMERCIAL COOKING EQUIPMENT

(71) Applicant: Dexen Telemetry LLC, Santa Fe Springs, CA (US)

(72) Inventor: Yu-Shan Teng, Santa Fe Springs, CA (US)

(73) Assignee: Dexen Telemetry LLC, Santa Fe Springs, CA (US)

( * ) Notice: Subject to any disclaimer, the term of this patent is extended or adjusted under 35 U.S.C. 154(b) by 885 days.

(21) Appl. No.: 16/261,290

(22) Filed: Jan. 29, 2019

(65) Prior Publication Data

US 2020/0240712 A1    Jul. 30, 2020

(51) Int. Cl.
*F27D 19/00* (2006.01)
*F27D 21/02* (2006.01)
*F27D 21/00* (2006.01)

(52) U.S. Cl.
CPC .............. *F27D 19/00* (2013.01); *F27D 21/02* (2013.01); *F27D 2019/0006* (2013.01); *F27D 2019/0087* (2013.01); *F27D 2021/0057* (2013.01)

(58) Field of Classification Search
CPC ............. F27D 19/00; F27D 2019/0006; F27D 2019/0087; F27D 2021/0057; F27D 2021/026; F27D 21/02; F27D 21/04; A47J 36/321

USPC ..................................................... 99/324, 325
See application file for complete search history.

(56) References Cited

U.S. PATENT DOCUMENTS

| | | | |
|---|---|---|---|
| 6,330,499 B1* | 12/2001 | Chou ....................... | G07C 5/08 701/32.7 |
| 2005/0125102 A1* | 6/2005 | Nichols .............. | G05B 23/0235 700/276 |
| 2012/0083995 A1* | 4/2012 | Vorona ................. | G08G 1/0141 701/119 |
| 2013/0018803 A1* | 1/2013 | Challu ................... | G06Q 10/06 705/304 |

* cited by examiner

*Primary Examiner* — Hung D Nguyen
(74) *Attorney, Agent, or Firm* — Mark Terry

(57) ABSTRACT

A system for providing monitoring of commercial cooking equipment includes a database comprising a plurality of device records, and a plurality of technician records. The system further includes a computing device comprising a network interface device, a sensor coupled to the cooking unit, and a processor for reading the sensor data from the sensor and transmitting the sensor data to a server. The system further includes a server for receiving the sensor data, finding a technician within the vicinity that can service the cooking unit, and sending a message to the technician including the sensor data and the contact information for the owner of the cooking unit, so that the technician may service the cooking unit. The system is further configured for monitoring the performance and usage of the cooking unit; identifying potential problems and issues with the cooking unit; and sending a message to customers.

14 Claims, 8 Drawing Sheets

NETWORKED MONITORING SYSTEM FOR COMMERCIAL COOKING EQUIPMENT

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the field of commercial cooking equipment and, more specifically, to monitoring and maintaining commercial cooking equipment telecommunications networks.

BACKGROUND

The restaurant and food service industry is a 660 billion industry in the United States. Restaurants and other foodservice providers are so widespread that half of all adults have worked in food service in one way or another at some point in their lives. The food service industry encompasses any establishment that serves food to people outside their home. This includes restaurants, carryout operations, cafeterias, university dining halls, catering and vending companies, hotels and inns, and hospital and retirement centers.

One of the most important sectors of the restaurant and food service industry involves the servicing and repair of commercial cooking equipment. A variety of problems, however, are associated with the process of servicing and repairing commercial cooking equipment. Typically, end users become aware of problems with their commercial cooking equipment only when their commercial cooking equipment breaks down or fails to work as it should. This motivates the end user to start a search for a commercial cooking equipment technician, which often comprises looking on the internet, during which time the end user is left without properly functioning commercial cooking equipment, which can be dangerous and inconvenient.

The process of finding an appropriate commercial cooking equipment technician to service and repair commercial cooking equipment can also be hampered by schedules and distances. An end user may be successful in finding a commercial cooking equipment technician with the appropriate skills, however, the commercial cooking equipment technician may not have the time to service the commercial cooking equipment or may be located too far away from the end user to make it feasible to service the commercial cooking equipment.

Another problem associated with the servicing of commercial cooking equipment involves the need for replacement parts. Usually, a commercial cooking equipment technician must personally inspect the commercial cooking equipment to determine which parts, if any, require replacement. After this determination is made, the commercial cooking equipment technician must leave the premises, or place an order to acquire the replacement parts identified before returning to service the commercial cooking equipment. This process prolongs the service experience and lengthens the time the end user is left without properly functioning commercial cooking equipment.

Therefore, a need exists for improvements over the prior art, and more particularly for methods and systems that reduce the complexity, cost and time associated with detecting problems with commercial cooking equipment, finding an appropriate technician to service commercial cooking equipment, and servicing commercial cooking equipment.

SUMMARY

A system and method that facilitates the monitoring of commercial cooking equipment communicatively coupled with a communications network is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a distributed system for providing monitoring of commercial cooking equipment includes: 1) a database connected to a communications network, the database comprising: a) a plurality of device records, wherein each device record includes a device unique identifier, device owner contact information, a device message format, device sensor parameter data and a first device type; and b) a plurality of technician records, wherein each technician record includes technician contact information and a list of device types representing devices serviced by the technician; 2) a computing device connected to a cooking unit, the computing device comprising: a network interface device for connecting the computing device to the communications network; a sensor for detecting at least one signal from the cooking unit and generating corresponding sensor data; and a processor for reading the sensor data from the cooking unit and transmitting a message over the communications network via the network interface device, wherein the message is formatted according to the message format of the computing device and wherein the message includes the sensor data and a device unique identifier.

The distributed system further includes a server comprising: a network interface device for connecting the server to the communications network; a processor configured for: a) receiving the message from the computing device via the network interface device; b) reading the device unique identifier in the message; c) searching for and identifying a device record in the database that matches the device unique identifier; d) reading from the device record the device owner contact information, device message format, device sensor parameter data and the first device type; e) reading the sensor data from the message according to the device message format and the device sensor parameter data; f) searching for and identifying a technician record in the database having an address in the technician contact information within a predefined area of an address of the device contact information, and having a device type that matches the first device type; and g) sending, via the network interface device, a message to the technician using the technician contact information, wherein the message includes the sensor data, the first device type, and the device owner contact information.

BRIEF DESCRIPTION OF DRAWINGS

The accompanying drawings, which are incorporated in and constitute a part of this disclosure, illustrate various example embodiments. In the drawings.

DETAILED DESCRIPTION

Figure 1:
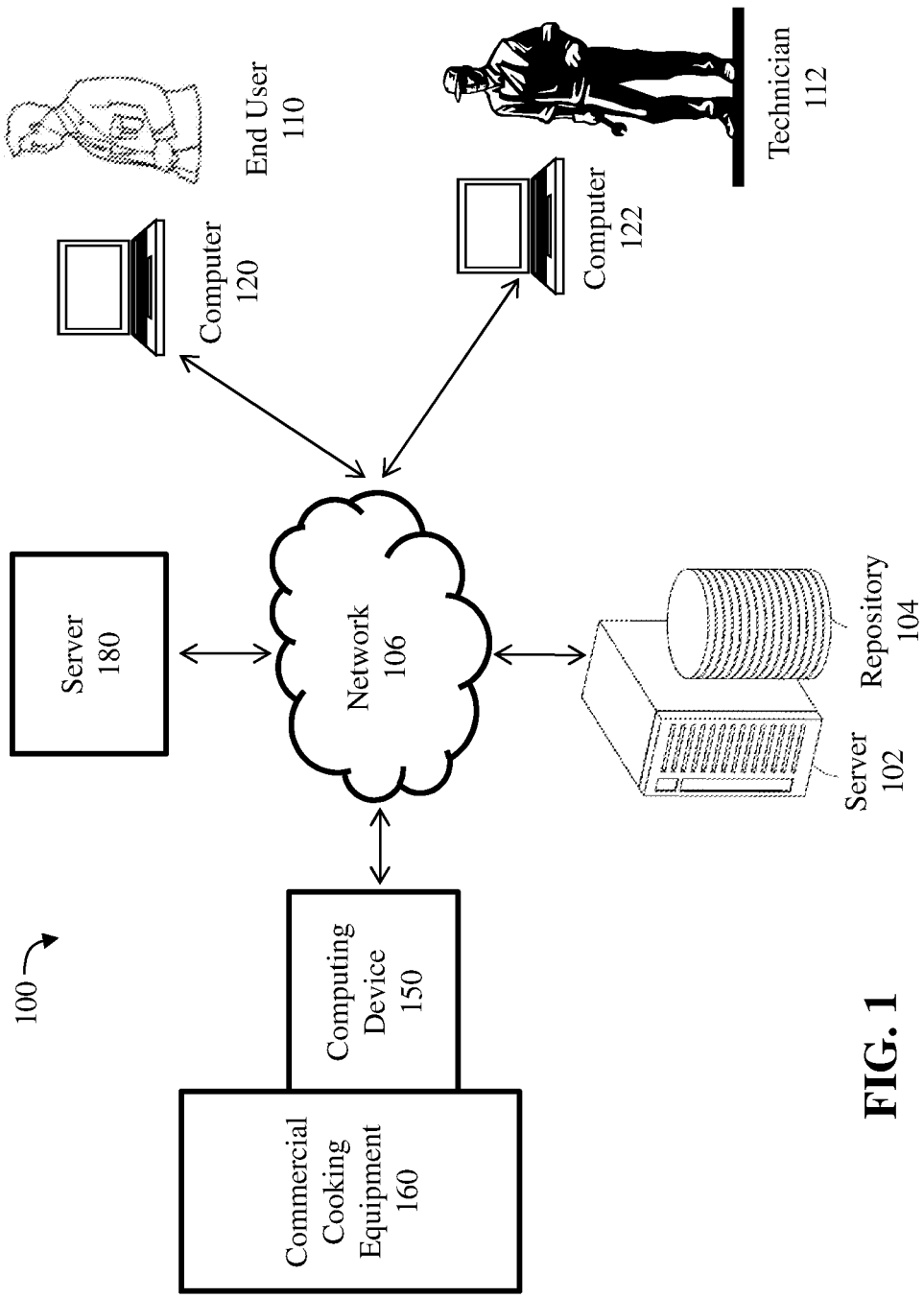
FIG. 1 is a diagram of an operating environment that supports a process for monitoring commercial cooking equipment and facilitating maintenance and repair of such commercial cooking equipment over a communications network, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed embodiments. Instead, the proper scope of the claimed embodiments is defined by the appended claims.

The methods and systems of the claimed embodiments reduce the complexity, cost, and time associated with detecting problems with commercial cooking equipment and finding an appropriate commercial cooking equipment technician to service and repair the commercial cooking equipment. First, the claimed embodiments allow end users to become aware of problems with their commercial cooking equipment before their commercial cooking equipment breaks down or fails to work as it should. The claimed embodiments also automate the process of finding a servicer of commercial cooking equipment, thereby eliminating the need to use the internet, local telephone books, or word of mouth in finding a technician that possesses the skills to service all major brands and types of commercial cooking equipment. This cuts down or eliminates the amount of time the end user is left without properly functioning commercial cooking equipment.

Systems and methods of the claimed embodiments can also be used to provide a complete solution to the functioning and performance of the commercial cooking equipment. For example, the system can use the diagnostic, environmental, and performance data of the commercial cooking equipment as a pre-warning system to alert the closest subscribing technician of potential replacement parts or failure, to send information regarding the warranty of the commercial cooking equipment, and for sending advertising and promotional material to the end user. The data gathered from the commercial cooking equipment can also be used by manufacturers as engineering references for designing and manufacturing commercial cooking equipment in the future. The data can also be used by parts suppliers for overall demographics and marketing campaigns. The data gathered can also be used to disseminate real time information to end users, distributors, and/or service technicians to reduce uncertainty, increase safety, and lower maintenance expenses.

Further, the claimed embodiments facilitate the process of finding an appropriate commercial cooking equipment technician to service and repair commercial cooking equipment by automating the process of finding a commercial cooking equipment technician with the appropriate skills, time, and within the vicinity of the end user's location. Also, the claimed embodiments eliminate the requirement of an elongated wait time to determine what is wrong with the commercial cooking equipment, identify the replacement part needed, travelling to pick up the replacement part, and replacing the part in the commercial cooking equipment. By reporting the specific problems and replacement parts needed to the technician, the technician can obtain the necessary parts and tools prior to travelling to the end user's location. This process shortens the service experience and shortens the time the end user is left without properly functioning commercial cooking equipment.

FIG. 1 is a diagram of an operating environment or system 100 that supports a process for monitoring commercial cooking equipment and facilitating service of such commercial cooking equipment over a communications network 106, according to an example embodiment. The environment 100 may comprise a computing device 150, computers 120, 122 and server 180, all of which may communicate with server 102 via a communications network 106. Computing device 150, server 102 and computers 120, 122 may comprise any computing devices, such as integrated circuits, printed circuit boards, processors, ASICs, PCBs, cellular telephones, smart phones, tablet computers, desktop computers, laptops, and game consoles, for example. Computing device 150, server 102 and computers 120, 122 may be connected either wirelessly or in a wired or fiber optic form to the communications network 106. Communications network 106 may include one or more packet switched networks, such as the Internet, or any local area networks, wide area networks, enterprise private networks, cellular networks, phone networks, mobile communications networks, or any combination of the above. In one embodiment, computing device 150 is a programmable logic controller or PLC.

Server 102 includes a software engine that delivers applications, data, program code and other information to networked devices 120, 122, 150. The software engine of server 102 may perform other processes such as transferring multimedia data in a stream of packets that are interpreted and rendered by a software application as the packets arrive. FIG. 1 further shows that server 102 includes a database or repository 104, which may be a relational database comprising a Structured Query Language (SQL) database stored in a SQL server or a database that adheres to the NoSQL paradigm. Mobile computing devices 120, 122 may also each include databases. The database 104 may serve sensor data, as well as related information, used by server 102 and mobile computing devices 120, 122 and device 150 during the course of operation of the claimed embodiments.

Computing device 150, computers 120, 122, and servers 102, 180 may each include program logic comprising computer source code, scripting language code or interpreted language code that perform various functions of the claimed embodiments. In one embodiment, the aforementioned program logic may comprise program module 607 in FIG. 6. It should be noted that although FIG. 1 shows only one computing device 150, two client computing devices 120, 122, and one server 102, the system supports any number of computing devices, servers, and client computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

Various types of data may be stored in the database 104 of server 102. For example, the database 104 may store one or more records for each computing device 150, i.e., a device record. A device record may include a device unique identifier, device owner contact information, a device message format, device sensor parameter data and a first device type. A device type includes the year, make, model, edition, or any other feature or classification that further identifies the commercial cooking equipment. A device unique identifier may be an alphanumeric value that is unique to a particular computing device 150. Device owner contact information may include the contact information for the person or entity that owns, possesses, or is responsible for the repair and maintenance of the commercial cooking equipment 160. Device owner contact information may include name, address, telephone number, email address, GPS coordinates, etc. Alternatively, instead of storing device owner contact information in a device record, the device record may store the location where the device is located at any point in time, which may be a geographical address or GPS coordinates representing the location of the device.

A device message format defines the format of messages sent by the computing device 150. An example of a device message format includes a map that defines each bit of a message (or a data packet comprising a portion of a message) and what data is represented by each bit of the message or data packet.

Device sensor parameter data defines the sensor data that will be provided by the sensors in the device and the parameters for each sensor datum. In one example, device sensor parameter data may specify that a message will specify the value of the signal, code, troubleshooting messages, and fault code stored in the memory of the computing device. In another example, the device parameter data may further specify that a device message will specify a temperature reading and a range of values for an acceptable temperature reading, a humidity reading and a range of values for an acceptable humidity reading, a barometric pressure reading and a range of values for an acceptable barometric pressure reading, a carbon monoxide reading and a range of values for an acceptable carbon monoxide emission reading, a water reading and a range of values for an acceptable water reading, a moisture reading and a range of values for an acceptable moisture reading, and a gas flow reading, and a range of values for an acceptable gas flow reading.

A first device type may be an alphanumeric value that indicates a model number, version number, make description, year, edition and other identifying features and classifications of the commercial cooking equipment 160. A device record may also include demographic data for a device owner and a distance or geographic range that defines a geographic area that shall be searched when seeking a technician to service the device. A device record may also include the maintenance or repairs that have been previously performed on the device and the date of expiration of warranty on any parts of the device.

In one embodiment, a device record may also include a map or table that defines what certain fault codes, malfunction codes, or troubleshooting messages mean. The map or table may describe or define the reason for a malfunction or fault, including the malfunctioning part or component. For example, the chart may specify the code or signal that corresponds with a malfunctioning spark igniter on a gas range, which requires replacement. The map or table may further include severity indicator that indicates the severity or urgency of a problem exhibited by the commercial cooking equipment 160. A low severity indicator may indicate that a notice should be sent to the technician 112 either once or once every period of time, while a more severe emergency indicator may indicate that a notice or alert should be sent to the technician 112 periodically over a short period of time or more frequently. The severity indicator may be a textual value, or it may be a numerical value in a continuous range from 1 to 100. The notices or alerts may also be sent to an end user 110. Similar to the alerts sent to the technician 112, the alerts or notices sent to the end user 110 provide valuable information. The alerts or notices sent to the end user 110 allows the end user to identify if a problem exists before it causes more damage to the device or makes it unusable. The alerts, messages or notices may also be used to send other information to the consumer 110 such as warnings, warranty information, and advertising and promotional material. In another embodiment, the map or table described above is not located in the device record but rather is located in a separate device profile record, wherein the device record includes a pointer to the separate device profile record (and/or the device profile record includes a pointer to the device record).

In another example, the database 104 may store one or more records for each technician 112, i.e., a technician record. A technician record may include technician contact information (such as name, address, telephone number, email address, etc.) and a list of device types that represent devices serviced by the technician, i.e., the list of device types represent the service skills possessed by a particular technician regarding his ability to service certain types of commercial cooking equipment. A technician record may also include a unique identifier for a technician, demographic data for a technician and a distance or geographic range that defines a geographic range or area that is serviced by the technician. In yet another example, the database 104 may store one or more device profile records wherein each such record may include a map or table that defines what certain fault codes, malfunction codes, or signals mean.

In one embodiment, a device record may include any of the data found in a technician record, or a device record may include a link to one or more technician records, such that it is predefined which technician or technicians are slated or assigned to service the cooking unit of the device record. In another embodiment, a technician record may include any of the data found in a device record, or a technician record may include a link to one or more device records, such that it is predefined which technician or technicians are slated or assigned to service the cooking unit(s) of the device record(s).

Figure 2:
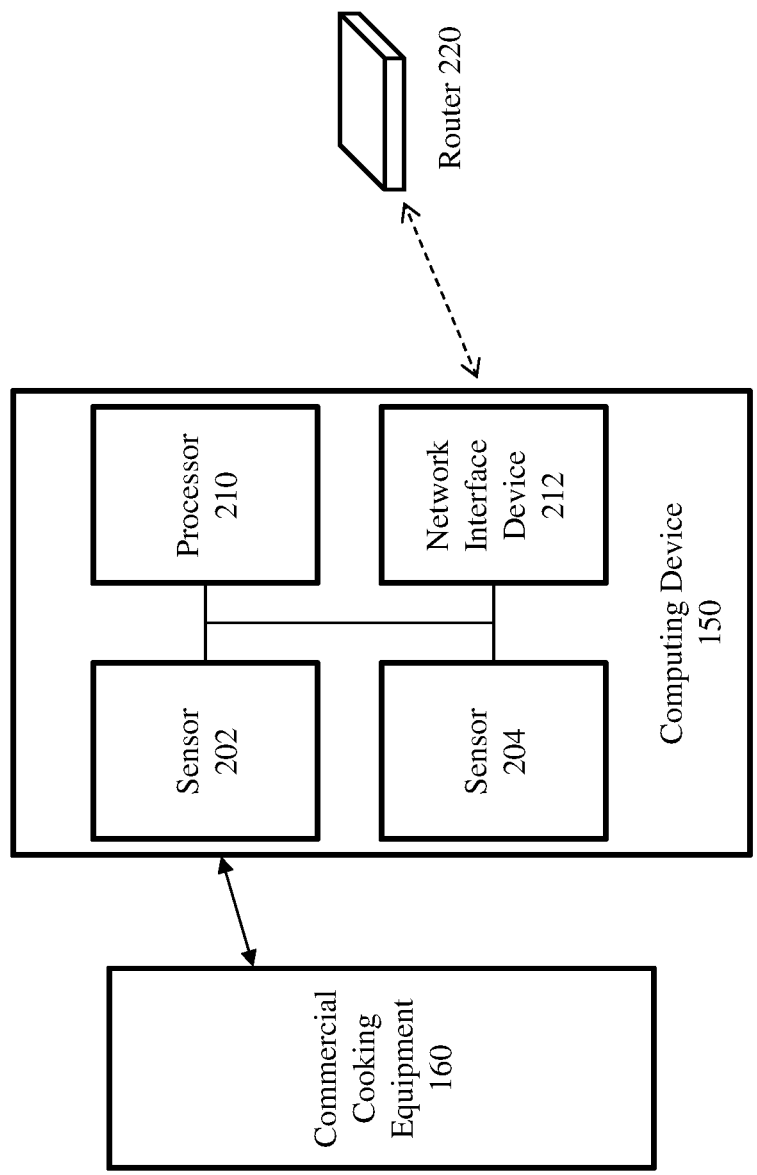
FIG. 2 is a block diagram showing the main components of computing device for monitoring commercial cooking equipment using the communications network, according to an example embodiment.

FIG. 2 is a block diagram showing the main components of a computing device 150 for monitoring commercial cooking equipment using the communications network 106, according to an example embodiment. FIG. 2 shows that computing device 150 includes a processor 210 and a network interface device 212, as described more fully in FIG. 6 below. A network interface device 212 (also known as a network interface card, network adapter, LAN adapter and by similar terms) is a computer hardware component that connects a computer to a computer network, such as network 106. The network interface device 212 implements the electronic circuitry required to communicate using a communications protocol such as Ethernet, Wi-Fi, Zig Bee or Token Ring. In one embodiment, the network interface device 212 may connect (in either a wired or wireless manner) to a router 220, which may be located at or near the location that houses the commercial cooking equipment 160. Alternatively, the router may be included in the computing device 150.

FIG. 2 also shows that computing device 150 may include one or more sensors 202, 204 that detect signals, code, troubleshooting messages, or fault code from the commercial cooking equipment. FIG. 2 also shows that computing device 150 may include one or more environmental sensors 202, 204, which may comprise temperature sensors, humidity sensors, carbon monoxide sensors, water sensors, barometric pressure sensors, moisture sensors, gas flow sensors, or the like. The sensors 202, 204 may report sensor data to the processor 210, which then transmits the sensor data to the server 102 via network interface device 212.

In one embodiment, computing device 150 has a direct data communication connection with the processor or communications bus of the commercial cooking equipment 160, such as a serial data port connection, which may be a physical wire interface through which data transfers. Examples of a serial data port connection include FireWire and USB. In this embodiment, the computing device 150 receives message from the processor or communications bus of the commercial cooking equipment 160, wherein the message may include troubleshooting messages, sensor readings, fault codes, malfunction codes and the like.

Figure 3:
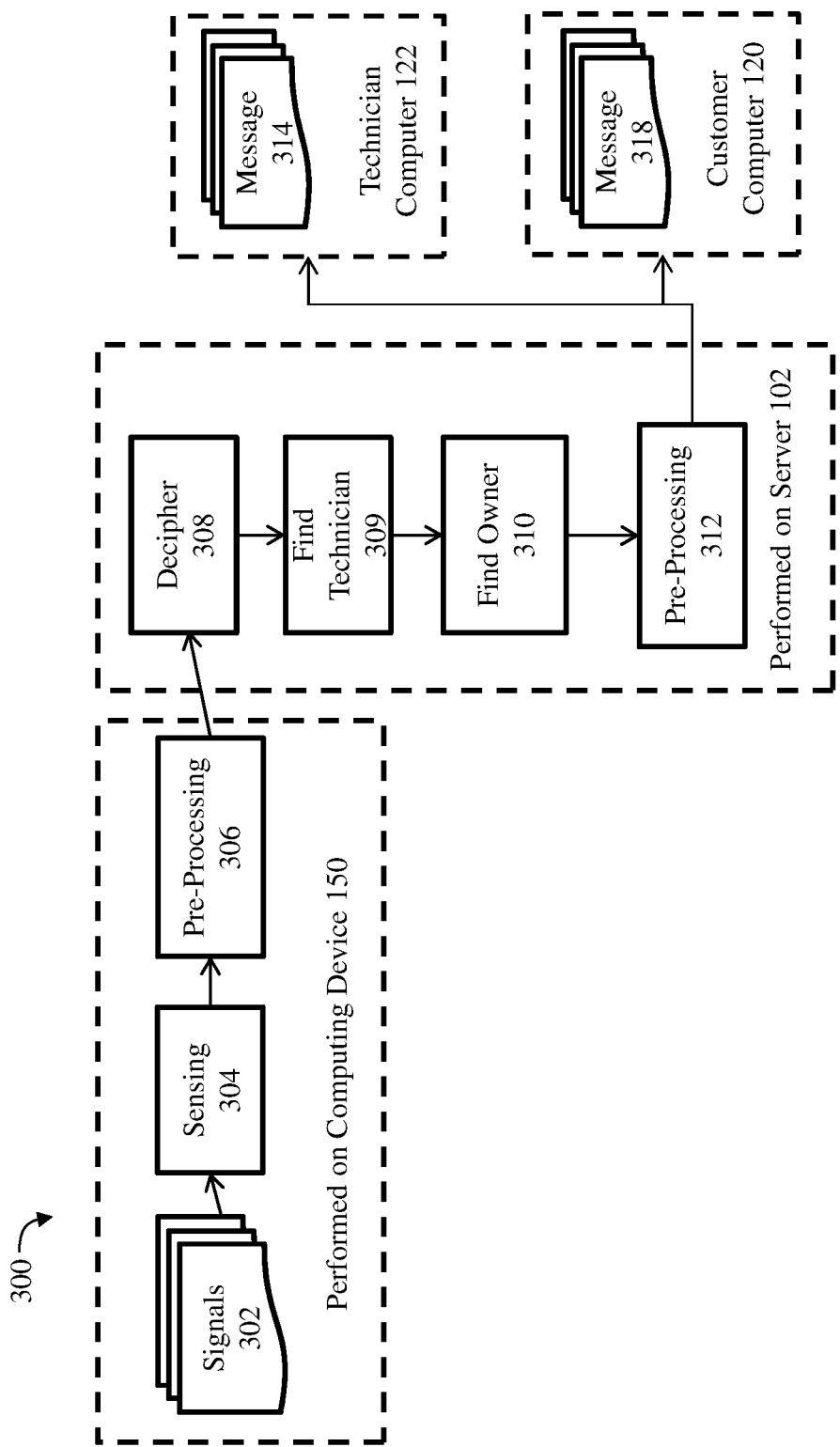
FIG. 3 is a block diagram showing the overall functions performed by the main components of the system for monitoring commercial cooking equipment and facilitating maintenance and repair of such commercial cooking equipment over the communications network, according to an example embodiment.

FIG. 3 is a block diagram showing the overall functions or processes 300 performed by the main components of the system 100 for monitoring commercial cooking equipment and facilitating repair and service of such commercial cooking equipment over the communications network 106, according to an example embodiment. FIG. 3 shows how computing device 150 collects sensor data from a commercial cooking unit 160, sends the sensor data to server 102, which processes the sensor data and generates a service message that may be displayed for a technician 112 to view on his computer 122. The process starts with the emanation of signals 302 by the commercial cooking unit 160. The signals 302 may include the blinking of lights, sensor data, troubleshooting messages, fault codes, or the like (as described above). Next, a sensing process 304, which may be implemented by sensors 202, 204, reads the signals 302. Then, based on the signals 302 that were sensed, device 150 performs pre-processing 306 on a message that is sent to the server 102. In one embodiment, pre-processing 306 may include encoding data into a message format ready for transmission to the server 102. The data encoded into the message may include the sensor data, as well as other data.

Next, the message is received by the server 102, which deciphers the message in step 308. This step may include reading the sensor data, together with any other data included in the message. Next, in step 309, the server 102 finds the correct technician 112 based on the data included in the message. Optionally, in step 310, the server 102 finds the end user 110 based upon the data included in the message. After performing one or all of steps 309 and 310, the server 102 then reads the contact information of one or all of the technicians and end users it found in steps 309 and 310 and performs pre-processing 312 on messages 314 and 318, respectively, such that messages or alerts message 314 is sent to the computer 122 of the technician 112, and messages or alerts message 318 is sent to the computer 120 of the end user 110. Pre-processing 312 may include encoding data into a message format ready for transmission to the computer 122 of the technician 112, and the computer 120 of the end user 110. The data encoded into the message may include sensor data, as well as other data. The final result of process 300 is human readable data displayed on a screen or other computer display of computers of the technician 112 and end user 110. In other embodiments, various combinations of excluding steps 309 or 310 may be used such that either messages 314 or 318 are not transmitted to the computers of either the technician or the end user. Note that the dotted lines and related text of FIG. 3 indicate which devices of environment 100, in one embodiment, perform the processes 300.

Figure 4A:
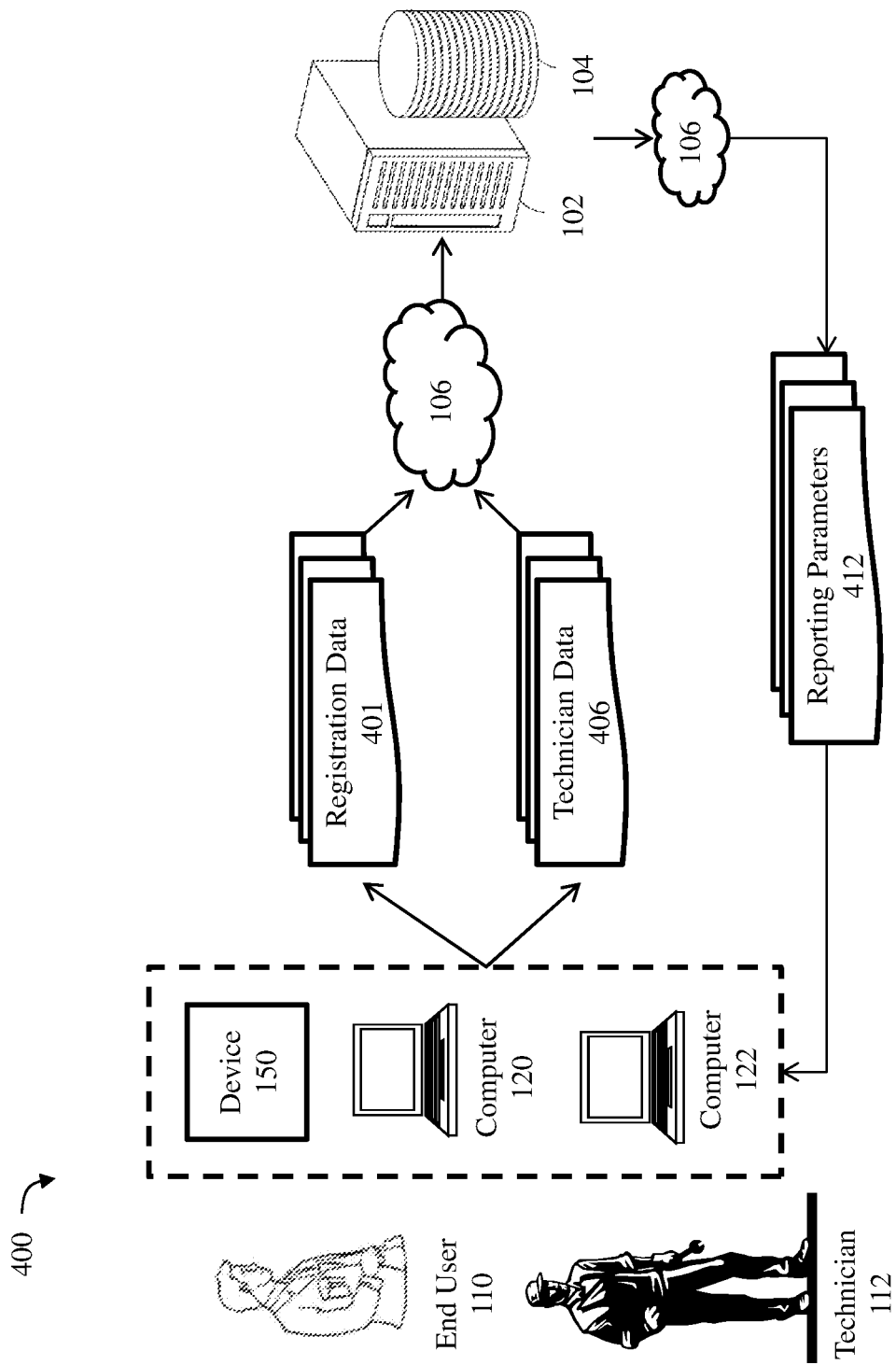
FIG. 4A is a diagram showing the data flow of the registration process over the communications network, according to an example embodiment.
Figure 4B:
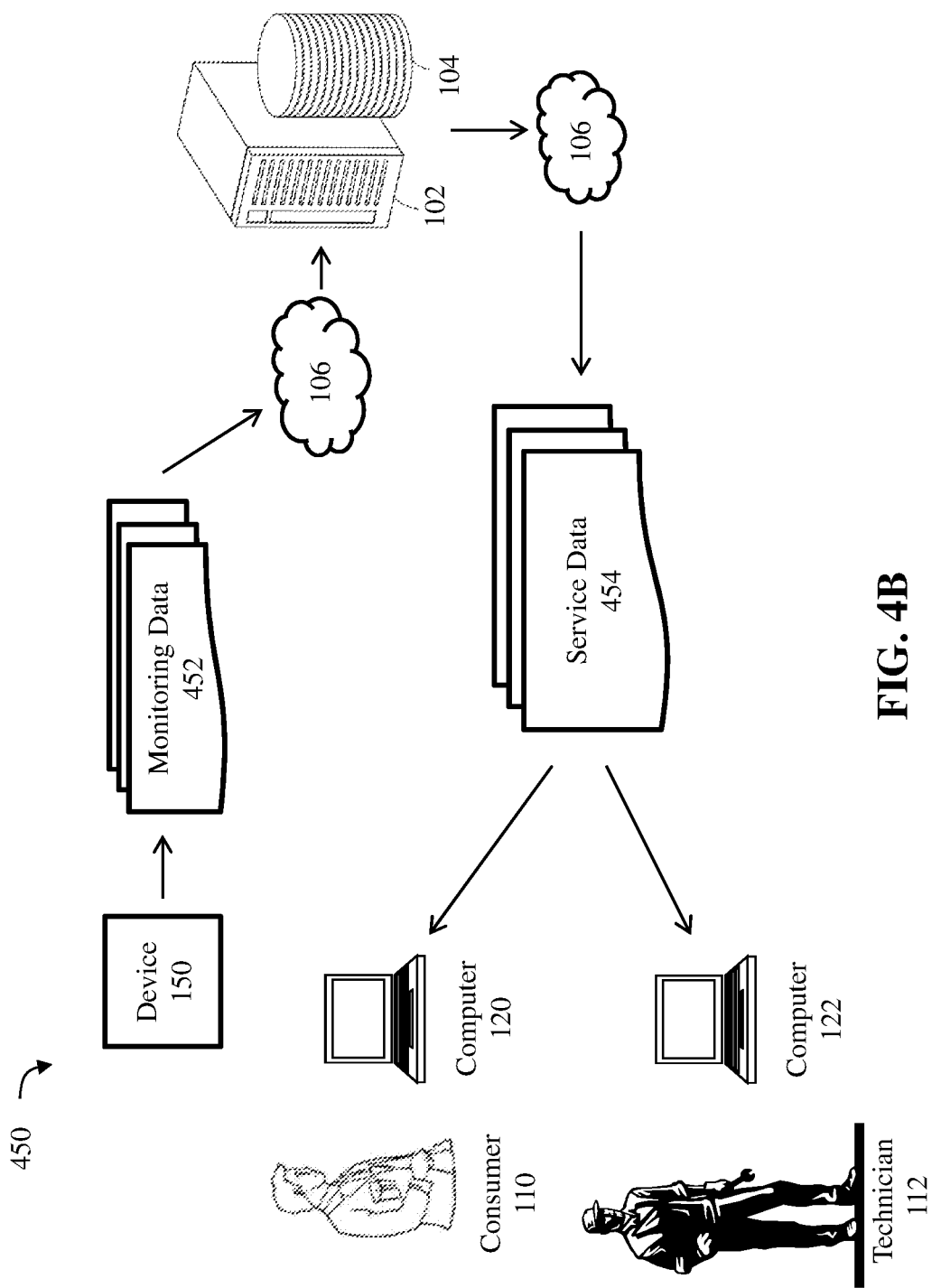
FIG. 4B is a diagram showing the data flow of the monitoring process over the communications network, according to an example embodiment.
Figure 5A:
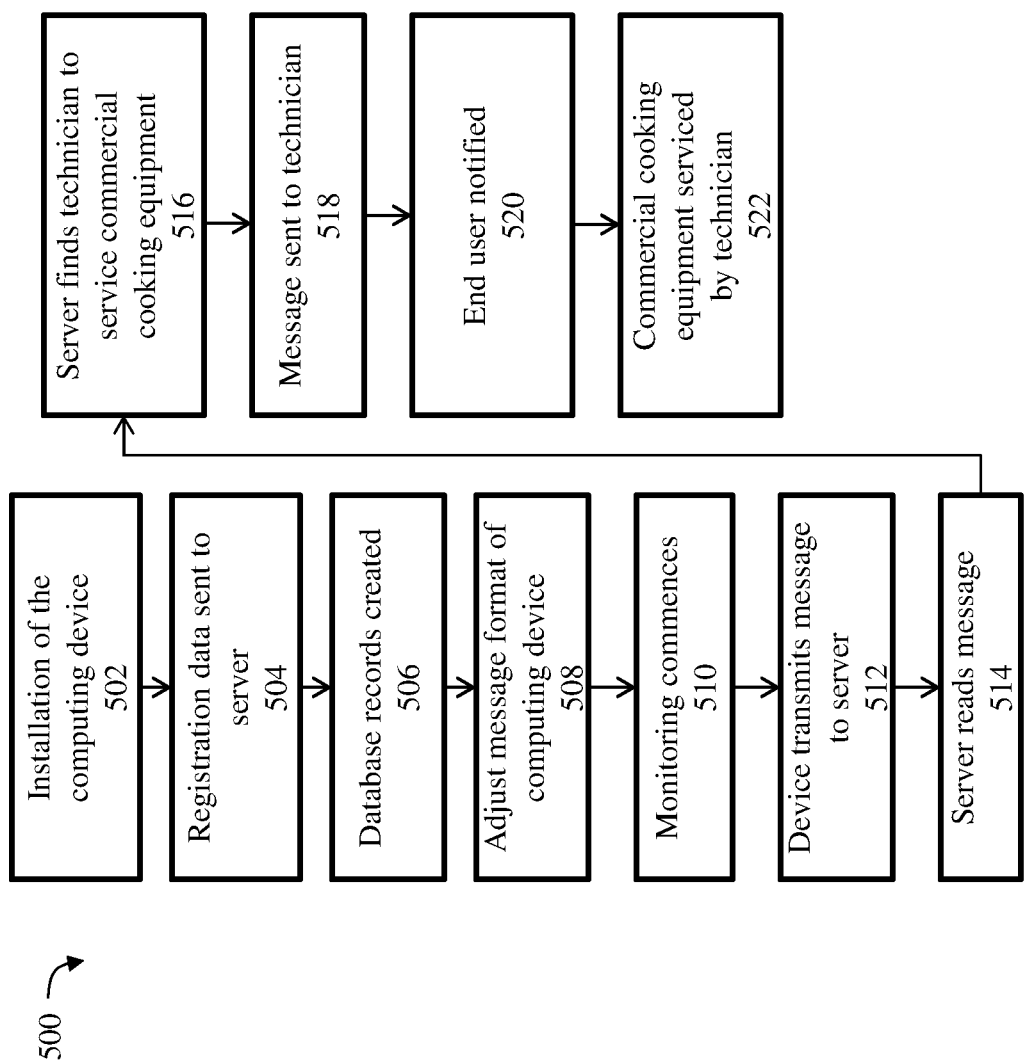
FIG. 5A is a flow chart showing the control flow of the process for monitoring commercial cooking equipment and facilitating maintenance and repair of such commercial cooking equipment over the communications network, according to an example embodiment.
Figure 5B:
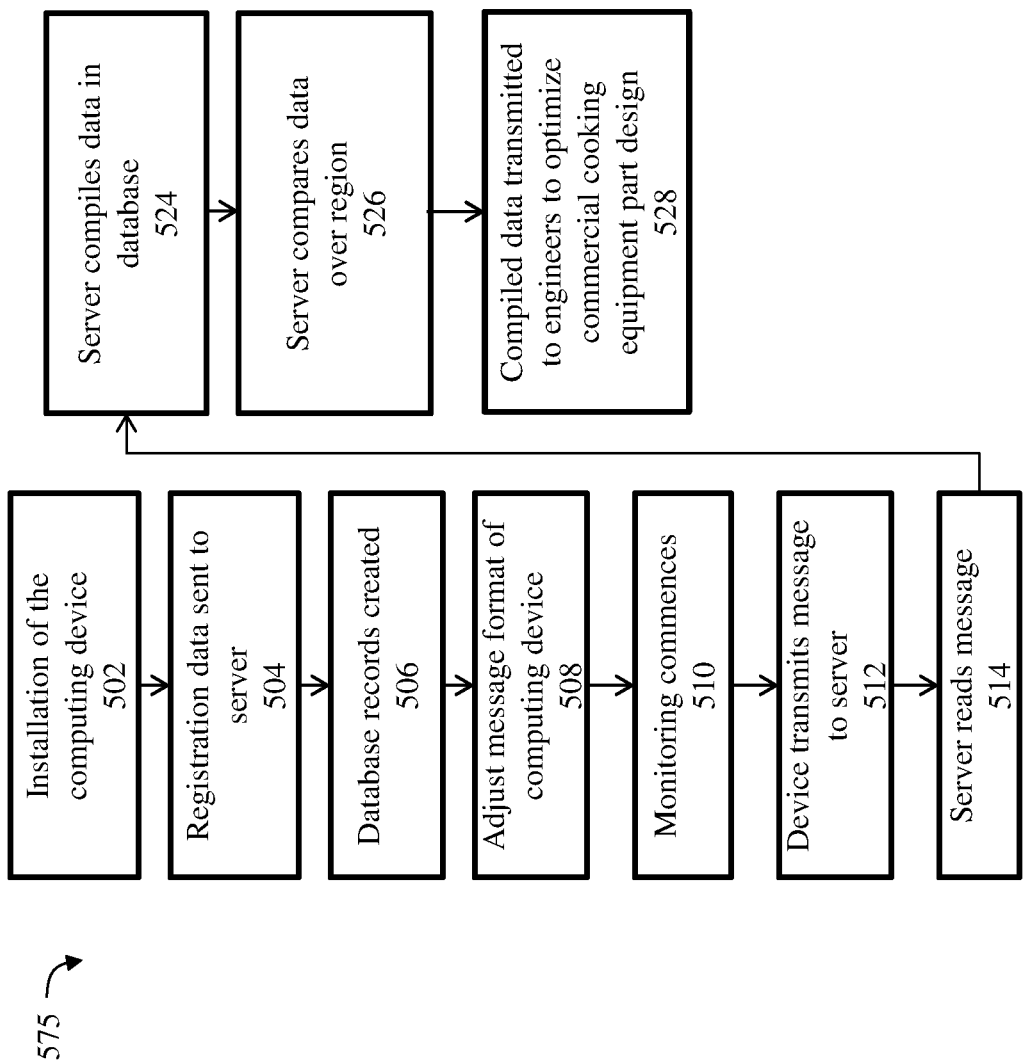
FIG. 5B is another flow chart showing the control flow of the process for monitoring commercial cooking equipment and sending data to engineers to facilitate optimum design and performance of commercial cooking equipment and parts; according to an example embodiment.

FIGS. 5A, and 5B are flow charts showing the control flow of the process 500 for monitoring commercial cooking equipment and facilitating servicing and repair over the communications network, according to an example embodiment. Processes 500 and 575 describes the general steps that occur when a computing device 150 is installed and registered, and subsequently begins operation monitoring and initiating service calls for commercial cooking equipment 160. The process 500 is described with reference to FIGS. 4A and 4B, wherein FIG. 4A shows the general data flow of the registration process 400 and wherein FIG. 4B shows the general data flow of the monitoring and service call process 450.

The process 500 begins with step 502 comprising the installation of the computing device 150, which may be a programmable logic controller, in relation to the commercial cooking equipment 160. As described above with respect to FIG. 2, the device 150 may be attached to the commercial cooking equipment 160 such that the device 150 may read signals, code, troubleshooting messages, or fault code from the commercial cooking equipment 160 and utilize sensor readings using sensors 202, 204. In another embodiment, the device 150 may be attached to the commercial cooking equipment 160 via a direct, wired data port connection such that the device 150 may read data from the commercial cooking equipment 160, as well as take sensor readings using sensors 202, 204.

In step 504, the device 150 performs a registration process. In one embodiment, the registration process is performed by the computer 122 of the technician 112 in conjunction with device 150. In this embodiment, the computer 122 connects to the device 150 either in a wired format, via a wired data port connection, or in a wireless format, using a wireless networking standard, such as Zig Bee, Wi-Fi or Bluetooth. In another embodiment, the registration process is performed by the computer 120 of end user 110 in conjunction with device 150. In yet another embodiment, the registration process is performed solely by the device 150, wherein on-device settings such as a Wi-Fi password, can be input into the device 150 using a small screen or other I/O interface in the device 150.

In step 504, the device 150 and/or computer 120/122 may send registration data 401 to the server 102. The registration data 401 may include any of the data included in a device record, as defined above, such as a device unique identifier, device owner contact information, a device message format, device sensor parameter data and a first device type. In one embodiment, certain ones of the registration data 401 may be predefined in the device 150 and therefore are not editable before transmission as registration data 401, such as device message format, device sensor parameter data and a first device type. In another embodiment, certain ones of the registration data 401 may be entered or defined by the end user 110 or technician 112 in the computer 120 or 122 before transmission as registration data 401, such as device owner contact information and technician contact information.

In one optional embodiment, in step 504, the device 150 and/or computer 120/122 may send technician data 406 to the server 102. The technician data 406 may include any of the data that may be included in a technician record, as defined above. The technician data 406 corresponds to the technician 112 that has installed the computing device 150 in relation to the commercial cooking equipment 160.

In step 506, the server 102 may receive registration data 401 and create corresponding records in the database 104. In the case of receiving registration data 401, the server 102 creates one or more corresponding device records for the device 150 in the database 104. The one or more device records will include the data included in the registration data 404. In the optional case of receiving technician data 406, the server 102 creates one or more corresponding technician records for the technician 112 in the database 104. The one or more technician records will include the data included in the technician data 406. In another embodiment, prior to process 500, one or more corresponding technician records for the technician 112 already exist in the database 104. In this embodiment, the technician data 406 may simply include a unique identifier for the technician 112, such that the device record(s) can be associated with the technician record(s).

Optionally, in step 506, the device record(s) are associated with the technician record(s). In one alternative, the device record(s) may include the data of the corresponding technician record(s). In another alternative, the device record(s) may include a link to the technician record(s), such that it is predefined which technician or technicians are slated or assigned to service the commercial cooking equipment of the device record. In another alternative, the technician record(s) may include any of the data found in the corresponding device record(s), or the technician record(s) may include a link to the device record(s).

Optionally, in step 506, the system can be configured such that an engineer receives certain information such as failure rates, which parts failed, frequently failure, and other statistics, data and information that assist the engineer to design, manufacture and optimize future commercial cooking equipment and performance. In other embodiments, information and data can also be used to create marketing campaigns, especially information pertaining to the demographics of owners and customers.

In optional step 508, the server 102 sends a message (such as embedded in 401) to the device 150 defining the data required by the server 102, i.e., the desired reporting parameters of the device 150. In response, the device 150 adjusts its message format parameters (as defined in the device record, described above) to reflect those defined in the message, i.e., the device 150 adjusts the monitoring data 452 it sends to reflect what the server 102 desires. Recall that the device 150 may include a multitude of sensors 202, 204 and therefore may possess a multitude of sensor data to report to server 102. However, server 102 may not require all of the sensor data available, and therefore, in order to save bandwidth, processing and usage, the server 102 may specify the subset of data required by the server 102.

In step 510, the installation and registration procedures have concluded, and the monitoring process begins. In step 512, the device 150 receives signals 302 from the device 150. The signals 302 may include the blinking of lights, sensor data, troubleshooting messages, fault codes, codes or the like (as described above). Also, in step 512, the device 150 generates a message including monitoring data 452 and sends the message to the server 102. The monitoring data 452 may include any of the sensor data sensed by device 150, as well as additional data, such as a device unique identifier for the device 150.

In one optional step after step 512, the message generated by device 150 is sent to a message queue or buffer pool server. This function of the message queue or buffer pool server is to buffer incoming messages faster than other servers can process in a timely fashion. The queuing or buffering process allows for greater scalability by allowing the server 102 to catch up to or start more server instances to process larger amounts of messages in parallel.

In step 514, the server 102 receives the message, unencodes or deciphers the message and reads the data in the message. The server 102 may read the device unique identifier in the message, and subsequently accesses a device record in the database 104 that matches the device unique identifier. Any of the data available in a device record may be accessed and read in this step. For example, in step 514, the server 102 reads from the device record the device owner contact information, device message format, device sensor parameter data and the first device type. Then, the server 102 reads the sensor data from the message according to the device message format and the device sensor parameter data.

In one embodiment, in step 514, the server 102 reads from the device record the table that defines what sensor data means. The map or table describes the reason for a malfunction or fault, including the malfunctioning part or component. For example, the chart may specify that the sensor data indicates that there is a malfunctioning spark igniter on a gas range, which requires replacement. Also, in step 514, the server 102 compares the sensor data from the message to the chart to determine the reason for the malfunction or fault. In another embodiment, in step 514 the server 102 reads from the map or table the severity indicator that indicates the severity or urgency of a problem exhibited by the commercial cooking equipment 160, as indicated in the message received from the device 150. A low severity indicator in the message may indicate that a notice should be sent to the technician 112 or the end user 110 either once or once every period of time, while a more severe emergency indicator in the message may indicate that a notice or alert should be sent to the technician 112 or the end user 110 periodically over a short period of time.

In step 516, the server 102 finds a technician to service the commercial cooking equipment 160 connected to device 150. The server 102 accomplishes this by accessing in the database 104 a technician record having an address in the technician contact information within a predefined area of an address of the device contact information and having a device type that matches the first device type. That is, in step 516 the server 102 looks for a technician record with an address within a predefined range of the address of the end user 110 (i.e., the owner or customer contact information) and with a device type that matches the type of commercial cooking equipment 160 (i.e., the first device type). In one embodiment, this search is performed by a separate search server 180.

In one alternative to step 516, the server 102 simply looks for technician contact information (or a link to a technician record) within the device record itself. This alternative is used in cases where it is predefined which technician or technicians are slated or assigned to service the commercial cooking equipment 160 of the device record. In another alternative to step 516, in order to determine whether a technician 112 qualifies as a match, the server 102 may access a scheduling or calendaring program of the technician 112 (wherein the scheduling or calendaring program includes the current work schedule or itinerary of the technician 112) to determine whether the technician 112 has any availability to service the commercial cooking equipment 160 160. If the technician has no availability, then the technician 112 is not a match. If the technician has availability, then the technician 112 can be a match, provided that the address and skills of the technician 112 also match, as described above.

In step 518, the server 102 generates a message and sends the message to the computer 122 of technician 112. In this step, the message may include any of the sensor data, any of the data in the device record (such as first device type and device contact information), as well as the reason for the malfunction or fault, as determined by the server in step 514. In step 518, the message may be sent to the email address, telephone number or other address of the technician using the technician contact information in the technician record found in step 516.

In step 522, the technician 112 services the commercial cooking equipment 160 connected to device 150. Optionally, prior to servicing the commercial cooking equipment 160, the technician may contact the owner or end user of the commercial cooking equipment 160, by using the contact information associated with the device 150. Alternatively, as shown in step 520, the server 102 may contact, in an automated fashion, the owner or end user housing the device 150, such as by using email, text or an automated phone call. In this manner, the technician or server 102 may arrange for the technician to service the commercial cooking equipment 160.

In an optional step before step 522, the server 102 may access a scheduling or calendaring program of the technician 112 to automatically place the servicing of the commercial cooking equipment 160 directly into the scheduling or calendaring program of the technician 112, so as to ensure that the commercial cooking equipment 160 will be serviced timely.

Optionally, other third parties can register to receive such messages. Such third parties contact information (such as name, address, telephone number, email address, etc.) can be stored in the database 104 on the server 106 in a record. Alternatively, such information contact information can also be stored on server 180.

FIG. 5B is a flowchart showing the control flow of the process 575 for monitoring commercial cooking equipment and sending data to engineers to facilitate optimum design and performance of commercial cooking equipment and parts. In steps 502 through step 508, the flow of the process can be the same as FIG. 5A. Similar to above, in step 512, the device 150 can generate a message that includes carbon dioxide emissions, part failure rate, part performance rate, and other data that can be received from the sensors 202, 204. In step 514, the server 102 receives the message, un-encodes or deciphers the message and reads the data in the message. The server 102 can store the data in the message in the database 104. Or alternatively, such data can be stored on the network 106 or the on the server 180. In step 524, the server can compile such data in the database 104. In step 526, the server 104 can compare said stored data over a predefined region to look for patterns or other regularities.

Optionally, the server can send such data in a message to the engineer without compiling or comparing the data. After receiving the message on the computer, in step 528, the engineer can compare, compile and run various types of analytical and statistical programs that are known in the art to analyze the data received by the message acquired in process 575. The engineer can use the data to analyze the failure or success of commercial cooking equipment and parts in various predetermined areas to optimize and decrease the failure rate of such commercial cooking equipment and parts. Demographical information of the customers and technicians contained in the device record, on the database 104 may also be used to facilitate optimization of marketing campaigns.

In one embodiment, the communications protocol used to send messages or data to and from computers 150, 180, 102, 120, and 122 include any of the communications protocols known in the art, such as HTTP, TCP, UDP, ICMP, FTP, MQTT and IMAP. In another embodiment, the communications protocol used to send messages or data to and from computers 150, 180, 102, 120, and 122 include any of the communications protocols that would fall under the Application Layer (7) of the OSI model.

Figure 6:
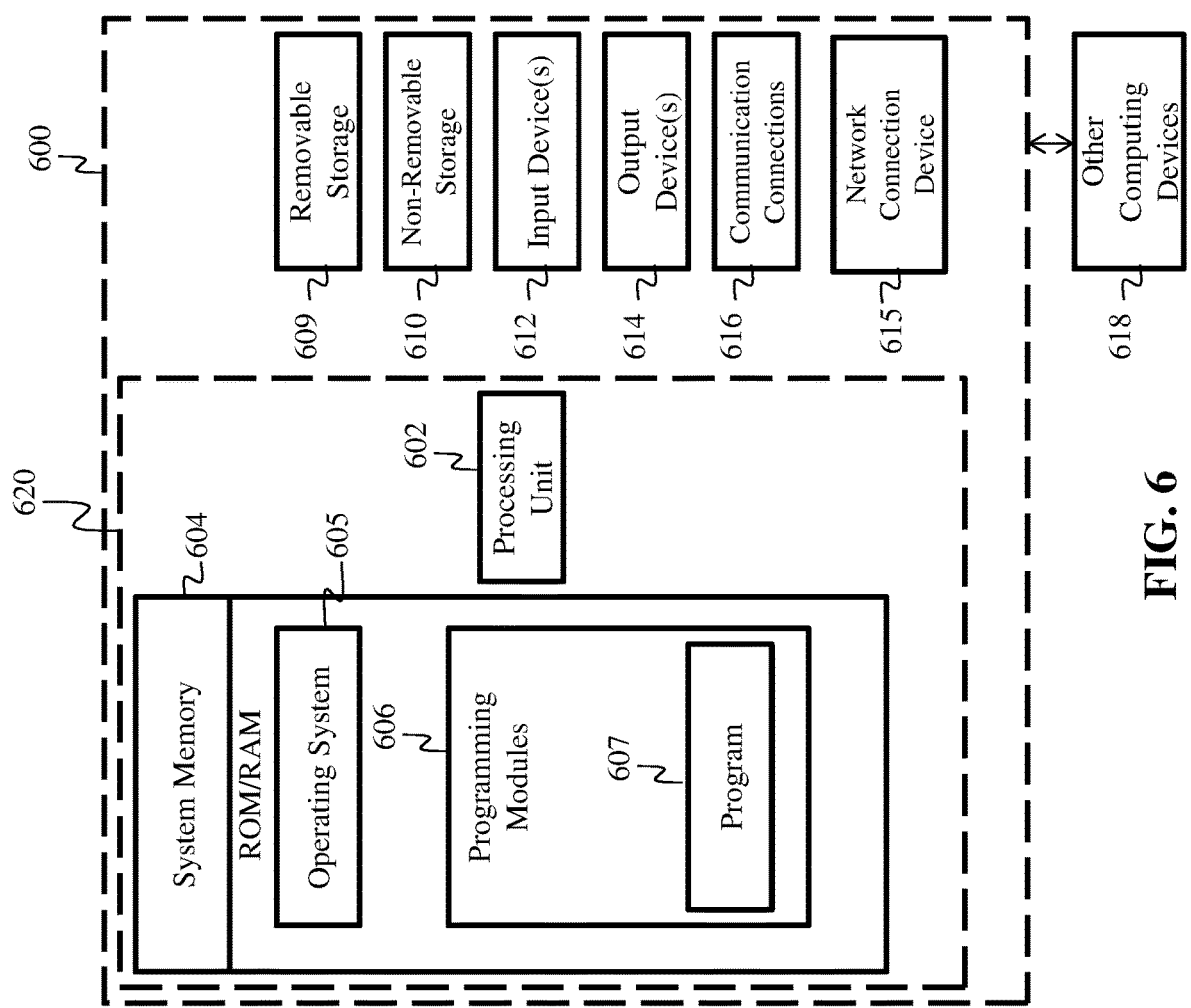
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by computing device 150, server 102, and computers 120, 122 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for devices 150, 102, 120, 122 and processes 300, 400, 450, 500, and 575 as described above. Processes 300, 400, 450, 500, and 575 may operate in other environments and are not limited to computing device 600.

With reference to FIG. 6, a system consistent with an embodiment herein may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random-access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of server 102 and computing device 150, for example. Furthermore, embodiments may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the process 500 as described above. The aforementioned processes are examples, and processing unit 602 may perform other processes. Other programming modules that may be used in accordance with claimed embodiments may include electronic mail and contacts applications, word processing applications, spreadsheet applications, database applications, slide presentation applications, drawing or computer-aided application programs, etc.

Generally, consistent with claimed embodiments, program modules may include routines, programs, components, data structures, and other types of structures that may perform particular tasks or that may implement particular abstract data types. Moreover, claimed embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, claimed embodiments may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments may be practiced within a general-purpose computer or in any other circuits or systems.

Embodiments, for example, are described above with reference to block diagrams and/or operational illustrations of methods, systems, and computer program products according to embodiments herein. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A distributed system for providing monitoring of commercial cooking equipment, comprising:
   1) a database connected to a communications network, the database comprising: a) a plurality of device records, wherein each device record includes a device unique identifier, device owner contact information, a device message format, device sensor parameter data and a first device type; and b) a plurality of technician records, wherein each technician record includes technician contact information and a list of device types representing devices serviced by the technician;
   2) a computing device connected to a cooking unit, the computing device comprising:
      a network interface device for connecting the computing device to the communications network;
      a sensor for detecting at least one signal from the cooking unit and generating corresponding sensor data;
      a processor for reading the sensor data from the cooking unit and transmitting a message over the communications network via the network interface device, wherein the message is formatted according to the device message format of the computing device and wherein the message includes the sensor data and a device unique identifier; and
   3) a server comprising:
      a network interface device for connecting the server to the communications network;
      a processor configured for: a) receiving the message from the computing device via the network interface device; b) reading the device unique identifier in the message; c) searching for and identifying a device record in the database that matches the device unique identifier; d) reading from the device record the device owner contact information, device message format, device sensor parameter data and the first device type; e) reading the sensor data from the message according to the device message format and the device sensor parameter data; f) searching for and identifying a technician record in the database having an address in the technician contact information within a predefined geographic area of an address of the device contact information, and having a device type that matches the first device type; and g) sending, via the network interface device, a message to the technician using the technician contact information, wherein the message includes the sensor data, the first device type, and the device owner contact information.

2. The distributed system of claim 1, wherein the computing device further includes at least one environmental sensor, wherein the at least one environmental sensor is for sensing environmental data associated with the cooking unit and generates corresponding sensor data.

3. The distributed system of claim 2, wherein an environmental sensor may comprise any one of a temperature sensor, a humidity sensor, a carbon monoxide sensor, a water sensor, a barometric pressure sensor, a moisture sensor, and a gas flow sensor.

4. The distributed system of claim 1, wherein the database further includes a table associated with each device record, wherein the table maps sensor data to a description of a problem with the cooking unit, and a level of severity of the problem.

5. The distributed system of claim 4, wherein the processor is further configured for reading from the device record the table, identifying in the table a description of a problem with the cooking unit and a level of severity of the problem that corresponds to the sensor data read from the message, and sending, via the network interface device, a message to the technician using the technician contact information, wherein the message includes the sensor data, the first device type, the device owner contact information, the description of the problem with the cooking unit and the level of severity of the problem.

6. A distributed system for providing monitoring of commercial cooking equipment, comprising:
   1) a database connected to a communications network, the database comprising: a) a plurality of device records, wherein each device record includes a device unique identifier, a device location, and a first device type; and b) a plurality of technician records, wherein each technician record includes technician contact information and a list of device types representing devices serviced by the technician;
   2) a computing device connected to a cooking unit, the computing device comprising:
      a network interface device for connecting the computing device to the communications network;
      a sensor for detecting at least one signal from the cooking unit and generating corresponding sensor data;
      a processor for reading the sensor data from the sensor and transmitting a message over the communications network via the network interface device, wherein the message is formatted according to a device message format of the computing device and wherein the message includes the sensor data and a device unique identifier; and
   3) a server comprising:
      a network interface device for connecting the server to the communications network;
      a processor configured for: a) receiving the message from the computing device via the network interface device; b) reading the device unique identifier in the message; c) searching for and identifying a device record in the database that matches the device unique identifier; d) reading from the device record the device location and the first device type; e) reading the sensor data from the message; f) searching for and identifying a technician record in the database having an address in the technician contact information within a predefined geographic area of the device address, and having a device type that matches the first device type; and g) sending, via the network interface device, a message to the technician using the technician contact information, wherein the message includes the sensor data, the first device type, and the device location.

7. The distributed system of claim 6, wherein the computing device further includes at least one environmental sensor, wherein the at least one environmental sensor is for sensing environmental data associated with the cooking unit.

8. The distributed system of claim 7, wherein an environmental sensor may comprise any one of a temperature sensor, a humidity sensor, a carbon monoxide sensor, a water sensor, a barometric pressure sensor, a moisture sensor, and a gas flow sensor.

9. The distributed system of claim 7, wherein the table maps sensor data to a description of a problem with the cooking unit and a level of severity of the problem.

10. The distributed system of claim 9, wherein the processor is further configured for reading from the device record the table, identifying in the table a description of a problem with the cooking unit and a level of severity of the problem that corresponds to the sensor data read from the message, and sending, via the network interface device, a message to the technician using the technician contact information, wherein the message includes the sensor data, the first device type, the device location, and the description of the problem with the cooking unit and the level of severity of the problem.

11. The distributed system of claim 6, wherein the database further includes a table associated with each device record, wherein the table maps sensor data to a description of a problem with the cooking unit.

12. A distributed system for providing monitoring of commercial cooking equipment, comprising:
1) a database connected to a communications network, the database comprising: a) a plurality of device records, wherein each device record includes a device unique identifier, a device location, a first device type and a table associated with each device record, wherein the table maps sensor data to a description of a problem with a cooking unit; and b) a plurality of technician records, wherein each technician record includes technician contact information and a list of device types representing devices serviced by the technician;
2) a computing device connected to the cooking unit, the computing device comprising:
   a network interface device for connecting the computing device to the communications network;
   a sensor for detecting signals emanating from the cooking unit and generating corresponding sensor data;
   an environmental sensor located adjacent to the cooking unit, wherein the at least one environmental sensor for sensing environmental data associated with the cooking unit and generating corresponding sensor data;
   a processor for reading the sensor data from the sensor and transmitting a message over the communications network via the network interface device, wherein the message is formatted according to a device message format of the computing device and wherein the message includes the sensor data and a device unique identifier; and
3) a server comprising:
   a network interface device for connecting the server to the communications network;
   a processor configured for: a) receiving the message from the computing device via the network interface device; b) reading the device unique identifier in the message; c) searching for and identifying a device record in the database that matches the device unique identifier; d) reading from the device record the device location, the first device type and the table; e) reading the sensor data from the message; f) identifying in the table a description of a problem with the cooking unit that corresponds to the sensor data read; g) searching for and identifying a technician record in the database having an address in the technician contact information within a predefined geographic area of the device address, and having a device type that matches the first device type; and h) sending, via the network interface device, a message to the technician using the technician contact information, wherein the message includes the sensor data, the first device type, the description of the problem with the cooking unit and the device location.

13. The distributed system of claim 12, wherein an environmental sensor may comprise any one of a temperature sensor, a humidity sensor, a carbon monoxide sensor, a water sensor, a barometric pressure sensor, a moisture sensor, and a gas flow sensor.

14. The distributed system of claim 13, wherein the table maps sensor data to a description of a problem with the cooking unit and a level of severity of the problem.

* * * * *